United States Patent [19]

Kohzai et al.

[11] 4,353,018
[45] Oct. 5, 1982

[54] CONTROL SYSTEM FOR SYNCHRONIZED OPERATION OF MACHINE TOOL MOTORS

[75] Inventors: Yoshinori Kohzai; Yoshiki Fujioka, both of Hino, Japan

[73] Assignee: Fujitsu Fanuc Limited, Tokyo, Japan

[21] Appl. No.: 179,937

[22] Filed: Aug. 20, 1980

[30] Foreign Application Priority Data

Aug. 24, 1979 [JP] Japan .................. 54-107893

[51] Int. Cl.$^3$ ............................................. G05B 19/24
[52] U.S. Cl. ..................................... 318/571; 408/10; 408/13
[58] Field of Search ................ 318/39, 571, 661, 561; 408/10, 13

[56] References Cited

U.S. PATENT DOCUMENTS

| | | | |
|---|---|---|---|
| 3,346,894 | 10/1967 | Lemelson | 318/39 X |
| 3,604,998 | 9/1971 | Haught et al. | 318/571 X |
| 3,720,135 | 3/1973 | Merner et al. | 318/571 X |
| 3,725,651 | 4/1973 | Cutler | 318/571 |
| 4,086,517 | 4/1978 | Yamaki et al. | 318/571 X |
| 4,266,171 | 5/1981 | Mashimo | 318/571 |

Primary Examiner—B. Dobeck
Attorney, Agent, or Firm—Staas & Halsey

[57] ABSTRACT

An improved control system for facilitating tapping work in a machining center of the type which performs a variety of machining operations automatically. Control is effected by establishing and maintaining a certain relationship between the operation of a spindle motor which rotates a tap, and the operation of a Z-axis feed motor which transports a table longitudinally of the tap, the table mounting a workpiece. Specifically, the spindle motor and Z-axis feed motor are driven in relation to one another at all times in such a manner that the equation $N_s = f_m/P$ will be satisfied, where $N_s$ (rpm) is the rotational speed of the spindle motor, $f_m$ is the feed speed of the table along the Z-axis, and P is the thread pitch of the tap. Apparatus for controlling the spindle motor includes a control circuit which is adapted to stop the spindle at a prescribed angle of rotation.

3 Claims, 3 Drawing Figures

CONTROL SYSTEM FOR SYNCHRONIZED OPERATION OF MACHINE TOOL MOTORS

BACKGROUND OF THE INVENTION

This invention relates to an improved system for a tapping operation in a machine tool, and more particularly to improvements in a tapping system in connection with a tool changing mechanism of a machining center which is capable of performing a variety of machining operations automatically.

Machining centers capable of performing milling by contouring control, as well as drilling and tapping in accordance with various fixed cycles, have been developed and are employed in many factories. For the tapping operation a tapper is mounted on the spindle of the machining center, after which a Z-axis feed motor for transporting a workpiece table is actuated to move the workpiece in such a manner that the tip of a tap, which is held by the tapper, approaches the opening of a hole which has been drilled in the workpiece. Then, as the spindle is being rotated, the Z-axis feed motor is allowed to transport the workpiece, thereby allowing the tap to cut a thread into the inner wall of the hole in the workpiece. When a thread of the desired length has been cut, the spindle is rotated in the reverse direction, and so is the Z-axis feed motor to allow withdrawal of the tap from the hole.

This tapping operation performed by the conventional machining center is not controlled with any direct correlation between the spindle motor and the Z-axis feed motor for the workpiece table, and requires that the motors be controlled in speed independently of one another, such as by determining the speed of the Z-axis feed motor in relation to the speed of the spindle. As a result, a number of disadvantages have been encountered in the prior art. Specifically, (1) when the Z-axis feed motor is halted the spindle motor begins to slow down but continues to thread the hole until motor rotation ceases, the result being elongation of the tap; (2) since there are instances where the actual speed of the spindle motor is greater than or less than the set speed, the tap may be elongated when it is thrust into the hole or contracted when it is allowed to withdraw from the hole; (3) if the Z-axis feed motor is rotated in the reverse direction as the spindle motor is slowing down or when it is at rest, the tap is pulled in the opposite direction and elongated; and (4) if the Z-axis feed motor is rotated in the reverse direction while the spindle motor is being accelerated in the reverse direction, the tap is pulled in the opposite direction and elongated. These disadvantages result in damaged screw threads and cause a deterioration in the dimensional precision of the threads. Another serious problem is the damage to the expensive tap as the result of the excessive forces which the tap experiences during the machining operation.

BRIEF SUMMARY OF THE INVENTION

The present invention is directed to a system which enables smooth tapping of a hole drilled in a workpiece. To this end, control is effected in such a manner that there is a correlation between the speed of a tapper rotating spindle and the speed of the workpiece relative to the tapper, and is such a manner that the spindle is stopped firmly at a prescribed angular position.

Accordingly, an object of the present information is to provide an operation control system for a machine tool that performs tapping, wherein the machine tool motors are driven and controlled so as to permit tapping to proceed smoothly.

Another object of the present invention is to provide an operation control system for a machine tool that performs tapping, wherein the machine tool motors are driven and controlled so as to permit a Z-axis feed motor, which transports a table mounting a workpiece, and a spindle motor, to be operated in relation to one another and controlled synchronously.

Still another object of the present invention is to provide an operation control system for a machine tool that performs tapping, wherein the machine tool motors are driven and controlled so as to permit a Z-axis feed motor, which transports a table mounting a workpiece, and a spindle motor, to be operated in relation to one another and controlled synchronously, and so as to permit the spindle motor to be stopped firmly at a desired angular position.

Other features and advantages of the invention will be apparent from the following description taken in connection with the accompanying drawings.

DETAILED DESCRIPTION OF THE PREFERRED EMBODIMENT

Figure 1:
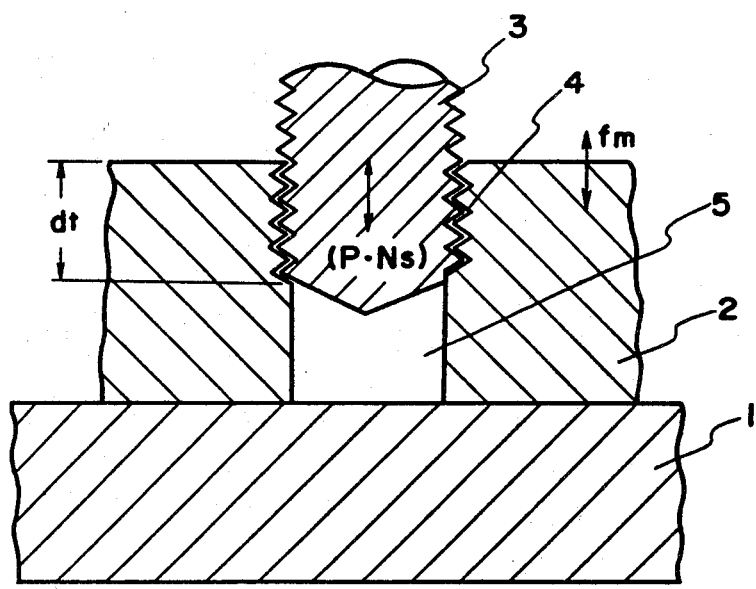
FIG. 1 is a cross-sectional view showing the tapping of a hole which has been drilled in a workpiece.

FIG. 1 illustrates a tapping operation in progress and depicts a table 1 supporting a workpiece 2 having a hole 5 whose inner wall is being provided with threads 4 by means of a tap 3. We shall let $f_m$ (mm/min) denote the feed speed of the table 1 along the Z-axis, namely the speed at which the workpiece 2 is pushed upward by the table 1 during the tapping operation, and the speed at which it is pulled downward at the conclusion of tapping. In addition, let $N_s$ (rpm) be the rotational speed of the spindle, namely the rotational speed of the tap 3, and let P represent the pitch of the threads 4. These three entities are related by the equation.

$$f_m = N_s \cdot P \qquad (1)$$

If this equation can be satisfied at all times, then the tap 3 will be able to penetrate and machine the hole 5 smoothly without undergoing elongation or contraction, and will also be able to withdraw from the hole smoothly without experiencing elongation or contraction when it is rotated in the reverse direction. In this connection it is necessary to calculate the number of revolutions N which the tap 3 makes between the initiation and completion of a machining operation, as well as the total machined length L. N can be obtained by dividing tap depth dt by the pitch P; hence, $N = dt/P$, and L can be derived from the following equation $$\pi \times r \times N = L \qquad (2),$$

where r is the diameter of the tap.

When tapping is performed, what is to be determined is not how much the rotational speed of the tap can be raised but, rather, a suitable cutting speed $V_c$ which depends upon the hardness of the tap and the material which constitutes the workpiece. In this connection, the cutting speed for tapping an ordinary hole for a set screw is 8 m/min or less, and is no more than 25 m/min if the workpiece consists of a light metal and the tap is extremely hard. The cutting time T is related to the cutting speed $V_c$ by the following equation $$T = L/V_c \tag{3}$$

If L as given by equation (2) is substituted for L in equation (3), and if T as defined by equation (3) is substituted for T in the formula $N/T = N_s$, then $N_s$ will be given by $$N_s = V_c/\pi \cdot r \tag{4}$$

Accordingly, once the rotational speed of the tap has been obtained in the foregoing manner, tapping is conducted by synchronizing the feed speed $f_m$ along the Z-axis to the rotational speed $N_s$ using the equation (1).

Figure 2:
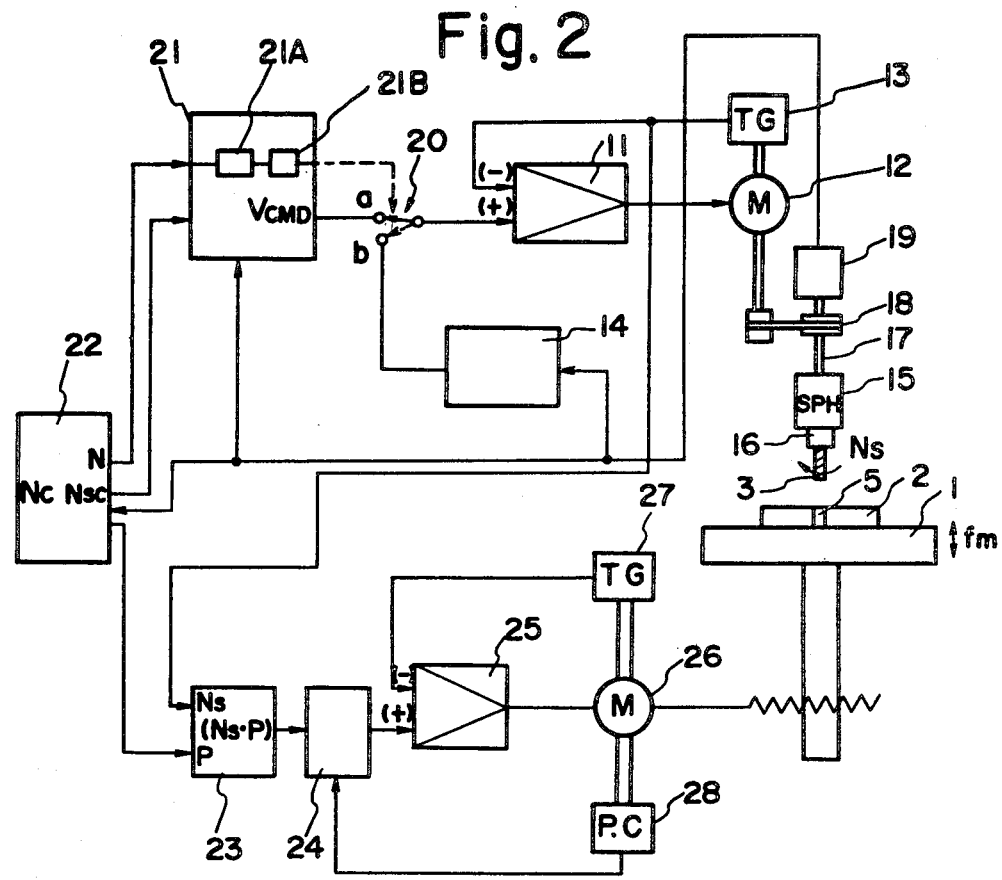
FIG. 2 is a block diagram illustrating an embodiment of the present invention.
Figure 3:
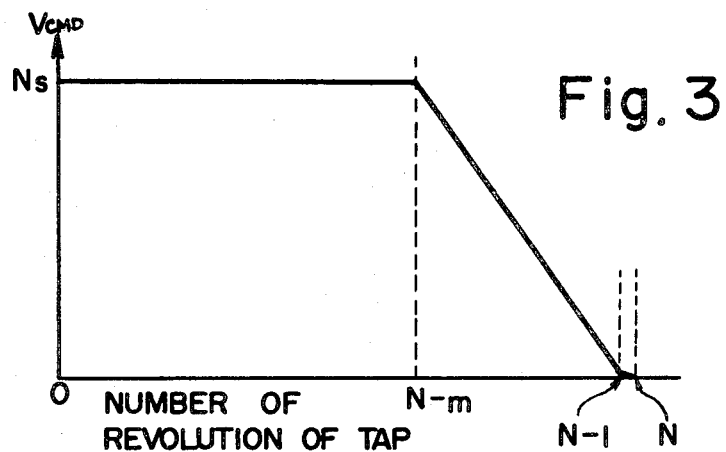
FIG. 3 is a graph showing the rotational speed of a tap plotted against the number of revolutions of the tap.

Illustrated in FIG. 2 is a block diagram of a control apparatus for establishing a relationship, given by equation (1), between the feed speed fm along the Z-axis and the rotational speed $N_s$ during a tapping operation. Provided are a speed control unit 11 for controlling the speed of a spindle 17, a DC motor 12 for the spindle, a tachometer generator 13 for detecting the rotational speed of the DC motor 12, a control circuit 14 for stopping the spindle at a prescribed angular position, a spindle mechanism 15 which mounts a tapper 16, the tapper holding the tap 3, a belt 18 which couples the spindle 17 to the DC motor 12, a resolver 19 which is coupled to the spindle mechanism 15, and a changeover switch 20. A circuit 21 for generating a speed command voltage is responsive to data $N_{sc}$ from a numerical control unit 22 and includes a down-counter 21A and a switch actuating circuit 21B. The circuit 21 delivers an analog signal, as shown in FIG. 3, which is equivalent to the rotational speed $N_s$ in the interval between 0 and the (N−m)th revolution of the tap 3, the signal serving as the speed command output $V_{CMD}$ during this interval. In the interval between the (N−m)th and (N−1)th revolution the signal acts a speed control signal which undergoes a sudden decrease in value. The circuit 21 produces also a signal which switches the changeover switch 20 from the a to the b side when the tap 3 has made (N−1) revolutions. The number of revolutions N of tap 3 can be counted by utilizing the resolver 19, by way of example. Numeral 23 designates an arithmetic circuit which is adapted to compute the feed speed $f_m$ along the Z-axis by taking the product of the pitch P, which is designated by the numerical control unit 22, and the rotational speed of the DC motor 12, namely the rotational speed $N_s$ of the tap 3, which is obtained from the tachometer generator 13. The arthimetic unit 23 produces a digital output which is equivalent to the feed speed $f_m$, the digital output consisting of pulses which correspond in number to the computed feed speed. This digital output is coupled to a position controller 24 which comprises a reversible counter in which the digital value expressed by the output received from the arithmetic circuit 23 is set, and a digital-analog (D-A) converter for converting the digital value into an analog speed signal. The analog speed signal is sent to a speed control unit 25 whose output is in turn coupled to a Z-axis feed motor 25 which comprises a DC motor. A tachometer generator 27 detects the rotational speed of the feed motor 26. Numeral 28 denotes a pulse coder.

In operation, the numerical control unit 22 supplies a tap rotational speed signal $N_s$ and a signal N which is indicative of the number of revolutions the tap is to make, these signals being determined upon considering such factors as the depth of the hole and the workpiece material, as mentioned above. The rotational speed signal $N_s$ is delivered to the changeover switch 20 as the speed command output $V_{CMD}$, while the signal N equivalent to the number of tap revolutions is set in the downcounter 21A. When the signal $N_s$ is applied to the speed control unit 11 through the changeover switch 20, the spindle motor 12 begins to rotate and has its rotational speed detected by the tachometer generator 13 which forms a speed control loop with the speed control unit 11, the detected speed of the motor 12 being fed back to the input side of the speed control unit 11 so that the motor 12 operates at the instructed rotational speed $N_s$. The rotation of the DC motor 12 is detected also by the resolver 19 whose output is applied to the down-counter 21A, the latter being decremented by one count each time the tap 3 makes on revolution.

Meanwhile the arithmetic circuit 23 is receiving the signal of tap rotational speed $N_s$ from the tachometer generator 13, and the signal indicative of the pitch P from the numerical control unit 22. The arithmetic circuit 23 computes the product of these two values ($N_s \times P$) and sends the result to the position controller 24 whose reversible counter is set thereby, the digital output of the counter being converted to an analog signal which is applied to the speed control unit 25. The Z-axis feed motor 26 rotates at the speed instructed by the speed control unit 25 and elevates the table 1 at the feed speed ($f_m = N_s \times P$) along the Z-axis. The rotational speed of the feed motor 26 is detected by the tachometer generator 27 and fed back to the input side of the speed control unit 25, whereby a speed control loop is formed. Hence, the Z-axis feed motor 26 rotates in the forward direction at the instructed rotational speed. As the Z-axis feed motor 26 rotates, the pulse coder 28 senses the rotation and produces position signals indicative of the position of table 1. The position signals are fed back to the input side of the position controller 24 which responds by performing an ordinary position controlling operation. Accordingly, the table 1 is transported in synchronism with the rotational speed $N_s$ of the tap 3 while the relation $f_m/P$ is maintained. As a result, the tap 3 is not subjected to an excessive force which can cause it to extend or contract while it proceeds to machine the interior of the hole 5.

When the tap 3 makes (N−m) revolutions, the signal $N_s$, in the form of a speed control signal, begins to decrease abruptly as shown in FIG. 3 owing to a signal from the downcounter 21A. The Z-axis feed motor 26 begins to slow down as a result but the tap 3 is not subjected to an excessive force since the speed of motor 26 is synchronized to the rotational speed of the tap at all times. When the content of the down-counter 21A in the speed command voltage generator circuit 21 reaches the value (N−1), the switch actuating circuit 21B responds by switching changeover switch 20 from side a to side b. The control circuit 14 for stopping the tap at the prescribed angular position includes a function generator employing a resolver, by way of example, and an amplifier for producing an amplified difference signal obtained by comparing the output of the function generator with the output of the resolver 19. Thus the control circuit 14 produces a difference signal between the output of the resolver 19 and the output of the function generator which has been preset to the angle at which the tap 3 is to stop. The difference signal is coupled to the speed control unit 11 through the switch 20, whereby the DC motor 12 for the spindle is made to rotate slowly in such a direction as will diminish the difference between the outputs of the function generator and the resolver 19. The DC motor 12 comes to rest when the difference is reduced to zero. Since the control of the tap stopping position is accomplished through a closed loop which includes the speed control unit 11, the DC motor 12 is stopped firmly at the prescribed angular position and is held there as if a brake were applied as long as the output of the control circuit 14 is zero.

Upon the completion of the thread cutting operation the numerical control unit 22 issues an instruction which causes the changeover switch 10 to switch from the side b to the side a, and which causes the DC motor 12 to rotate in the reverse direction to allow withdrawal of the tap 3. However, since the Z-axis drive motor 26 is controlled in concurrence with this operation and transports the workpiece 1 while maintaining the relation $f_m = N_s \times P$, the tap 3 is allowed to withdraw smoothly from the hole 5 without being elongated or contracted.

The present invention as illustrated and described above is applicable to a machining center equipped with a tap for a tapping operation, and synchronizes the rotational speed $N_s$ of the tap, mounted on the machining center spindle, to the feed speed $f_m$ of the table that transports the workpiece while maintaining the relation $f_m = N_s \times P$, where P is the pitch of the threads on the tap. This characterizing feature of the invention allows the thread cutting operation to proceed smoothly without elongating or contacting forces acting upon the tap. It also permits threads to be formed to a higher dimensional accuracy and prevents the tap from being damaged.

While the present invention has been described and illustrated in connection with an embodiment wherein tapping is carried out while transporting the table along the Z-axis to vary the distance between the trapper and the workpiece, it is also possible to apply the present invention to a machine tool in which tapping is performed by using the Z-axis drive motor to transport the spindle mechanism itself along the Z-axis while the table is held fixed.

As many widely different embodiments of the present invention may be made without departing from the spirit and scope thereof, it is to be understood that the invention is not limited to the specific embodiments thereof except as defined in the appended claims.

What we claim is:

1. A control system for synchronizing the operation of motors in a machine tool for performing tapping on a workpiece, which control system comprises:
first operation control section means for controlling a spindle drive motor which rotates the spindle of the machine tool, the spindle being configured for holding a tap for the tapping operation; and
second operation control section means for controlling a motor which moves the workpiece and the spindle relative to one another axially of the spindle;
wherein said first operation control section means includes controller means for stopping the spindle firmly at a rotational position set at a predetermined angle of rotation, the controller means including a comparator and a function generator for producing a signal indicative of the rotational position at which the spindle is to be stopped, said comparator comparing the output of said function generator with a signal which is obtained from a resolver and which corresponds to the actual angle of rotation of the spindle, the spindle being stopped firmly at such point that the output of said comparator becomes zero; and
wherein said second operation control system means includes means for moving the workpiece and the spindle relative to one another at all times at a speed which is the product of the rotational speed of the spindle and the pitch of the threads on the tap that performs the tapping operation.

2. A speed control system for synchronizing the operation of motors in a machine tool for performing a tapping operation on a workpiece, which speed control system comprises:
first operation control section means for controlling a spindle drive motor which rotates the spindle of the machine tool, the spindle being configured for holding a tap for the tapping operation; and
second operation control section means for controlling a motor which moves the workpiece and the spindle relative to one another axially of the spindle;
wherein said first operation control section means includes a speed command voltage generating circuit having down-counter means for storing the number of tap revolutions, the stored value being decremented by one count each time the tap makes one revolution, and having function generator means for producing a speed command signal VCMD in accordance with the count value stored by the down-counter means, position signal generating circuit means for producing a position signal indicative of the rotational position at which the spindle is to be stopped, speed control unit means for controlling the spindle drive motor in response to a speed control unit means input signal, and changeover switch means for selecting, in accordance with the count value stored in the down-counter means, one of the speed command signal VCMD and the position signal for use as the speed control unit means input signal; and
wherein said second operation control system means includes means for moving the workpiece and the spindle relative to one another at all times at a speed which is the product of the rotational speed of the spindle and the pitch of the threads on the tap that performs the tapping operation.

3. A control system according to claim 2, wherein the position signal generating means comprises resolver means operationally connected to the spindle for generating one revolution signal when the tap makes one revolution and for generating a signal corresponding to the angle of rotation of the spindle.

* * * * *

UNITED STATES PATENT AND TRADEMARK OFFICE
CERTIFICATE OF CORRECTION

PATENT NO. : 4,353,018
DATED : October 5, 1982
INVENTOR(S) : Kohzai et al.

It is certified that error appears in the above-identified patent and that said Letters Patent is hereby corrected as shown below:

Col. 3, line 46, "a to the b" should be --$\underline{a}$ to the $\underline{b}$--;

Col. 3, line 66, "25" should be --26--.

Col. 4, line 61, "a to side b" should be --$\underline{a}$ to side $\underline{b}$--.

Col. 5, line 19, "b to the side a" should be --$\underline{b}$ to the side $\underline{a}$--.

Signed and Sealed this

Twenty-second Day of February 1983

[SEAL]

Attest:

GERALD J. MOSSINGHOFF

Attesting Officer  Commissioner of Patents and Trademarks